US009443193B2

(12) United States Patent
Haberman et al.

(10) Patent No.: US 9,443,193 B2
(45) Date of Patent: Sep. 13, 2016

(54) SYSTEMS AND METHODS FOR GENERATING AUTOMATED EVALUATION MODELS

(71) Applicant: Educational Testing Service, Princeton, NJ (US)

(72) Inventors: Shelby J. Haberman, Highland Park, NJ (US); Mo Zhang, Plainsboro, NJ (US); Brent Bridgeman, Pennington, NJ (US)

(73) Assignee: Educational Testing Service, Princeton, NJ (US)

( * ) Notice: Subject to any disclaimer, the term of this patent is extended or adjusted under 35 U.S.C. 154(b) by 334 days.

(21) Appl. No.: 14/257,380

(22) Filed: Apr. 21, 2014

(65) Prior Publication Data

US 2014/0317032 A1    Oct. 23, 2014

Related U.S. Application Data

(60) Provisional application No. 61/813,674, filed on Apr. 19, 2013.

(51) Int. Cl.
*G06N 5/02* (2006.01)
*G09B 7/00* (2006.01)
*G06F 17/27* (2006.01)
*G06N 99/00* (2010.01)

(52) U.S. Cl.
CPC ............. *G06N 5/022* (2013.01); *G06F 17/274* (2013.01); *G06N 99/005* (2013.01); *G09B 7/00* (2013.01)

(58) Field of Classification Search
None
See application file for complete search history.

(56) References Cited

U.S. PATENT DOCUMENTS

| 2005/0142529 | A1* | 6/2005 | Andreyev | G09B 7/02 434/362 |
| 2009/0226872 | A1* | 9/2009 | Gunther | G09B 7/00 434/350 |

OTHER PUBLICATIONS

Attali et al, Performance of a Generic Approach in Automated Essay Scoring, 2010.*
Deane, Paul, Williams, Frank, Weng, Vincent, Trapani, Catherine; Automated Essay Scoring in Innovative Assessments of Writing from Sources; Journal of Writing Assessment, 6(1); Aug. 2013.
Deane, Paul; Using Writing Process and Product Features to Assess Writing Quality and Explore How Those Features Relate to Other Literacy Tasks; Educational Testing Service, Research Report RR-14-03; Jun. 2014.

(Continued)

*Primary Examiner* — Stanley K Hill
*Assistant Examiner* — Mikayla Chubb
(74) *Attorney, Agent, or Firm* — Jones Day (57) ABSTRACT

Systems and methods are described for generating a scoring model for responses. A computer-implemented method of calibrating a scoring model using a processing system for scoring examinee responses includes accessing a plurality of training responses for training the scoring model. The plurality of training responses are analyzed to derive values of multiple features (variables) of the training responses. The scoring model is trained based on the values of the multiple features of the training responses and one or more external measures of proficiency for each individual associated with a training response utilized in the training. The one or more external measures are not derived from the training responses. Based on the training, a weight for each of the multiple features is determined. The scoring model is calibrated to include the weights for at least some of the features for scoring examinee responses.

24 Claims, 5 Drawing Sheets

(56) References Cited

OTHER PUBLICATIONS

Almond, Russell, Deane, Paul, Quinlan, Thomas, Wagner, Michael, Sydorenko, Tetyana; A Preliminary Analysis of Keystroke Log Data From a Timed Writing Task; Educational Testing Service, Research Report RR-12-23; Nov. 2012.
Attali, Yigal; Automated Subscores for TOEFL iBT Independent Essays; Educational Testing Service, Research Report RR-11-39; Oct. 2011.
Attali, Yigal, Burstein, Jill; Automated Essay Scoring with E-Rater v.2; Journal of Technology, Learning and Assessment, 4(3); pp. 3-30; Feb. 2006.
Attali, Yigal, Powers, Don; A Developmental Writing Scale; Educational Testing Service, Research Report RR-08-19; Apr. 2008.
Bennett, Randy; CBAL: Results from Piloting Innovative K-12 Assessments; Educational Testing Service, Research Report RR-11-23; Mar. 2012.
Bennett, Randy, Gitomer, Drew; Transforming K-12 Assessment: Integrating Accountability Testing, Formative Assessment, and Professional Support; Educational Testing Service, Research Report RR-08-13; Jul. 2008.
Breland, Hunter, Bridgeman, Brent, Fowles, Mary; Writing Assessment in Admission to Higher Education: Review and Framework; Educational Testing Service, Research Report 99-03; 1999.
Breland, Hunter, Lee, Yong-Won; Muraki, Eiji; Comparability of TOEFL CBT Writing Prompts: Response Mode Analysis; Educational Testing Service, Research Report RR-75; Jul. 2004.
Common Core State Standards Initiative; 2011.
Deane, Paul; Writing Assessment and Cognition; Educational Testing Service, Research Report RR-11-14; Apr. 2011.
Deane, Paul, Fowles, Mary, Baldwin, Douglas, Persky, Hilary; The CBAL Summative Writing Assessment: A Draft Eighth-Grade Design; Educational Testing Service, Research Memorandum RM-11-01; Mar. 2011.
Deane, Paul, Quinlan, Thomas; What Automated Analyses of Corpora Can Tell Us About Students' Writing Skills; Journal of Writing Research, 2(2); pp. 151-177; 2010.
Deane, Paul, Quinlan, Thomas, Kostin, Irene; Automated Scoring Within a Developmental, Cognitive Model of Writing Proficiency; Educational Testing Service, Research Report RR-11-16; Apr. 2011.
Deane, Paul, Odendahl, Nora, Quinlan, Thomas, Fowles, Mary, Welsh, Cyndi, Bivens-Tatum, Jennifer; Cognitive Models of Writing: Writing Proficiency as a Complex Integrated Skill; Educational Testing Service, Research Report RR-08-55; Oct. 2008.
Ericsson, Patricia, Haswell, Richard; Machine Scoring of Student Essays: Truth and Consequences; Utah State University Press: Logan, UT; 2006.
Fu, Jianbin, Wise, Maxwell; Statistical Report of 2011 CBAL Multistate Administration of Reading and Writing Tests; Educational Testing Service, Research Report RR-12-24; Dec. 2012.
Fu, Jianbin, Wise, Maxwell, Chung, Seunghee; Statistical Report of Fall 2009 CBAL Reading Tests; Educational Testing Service, Research Memorandum RM-12-12; May 2012.
Lee, Yong-Won, Gentile, Claudia, Kantor, Robert; Analytic Scoring of TOEFL CBT Essays: Scores from Humans and E-rater; Educational Testing Service, Research Report RR-08-81; Jan. 2008.
Miller, Kristyan; Lindgren, Eva, Sullivan, Kirk; The Psycholinguistic Dimension in Second Language Writing: Opportunities for Research and Pedagogy Using Computer Keystroke Logging; TESOL Quarterly, 42(3); pp. 433-454; Sep. 2008.
Olive, Thierry, Kellogg, Ronald; Concurrent Activation of High- and Low-Level Production Processes in Written Composition; Memory & Cognition, 30(4); pp. 594-600; 2002.
Partnership for Assessment of Readiness for College and Careers (PARCC); Application for the Race to the Top Comprehensive Assessment Systems Competetion; 2010.
Porter, Andrew, McMaken, Jennifer, Hwang, Jun, Yang, Rui; Common Core Standards: The New U.S. Intended Curriculum; Educational Researcher, 40(3); pp. 103-116; 2011.
Rock, JoAnn; The Impact of Short-Term Use of Criterion on Writing Skills in Ninth Grade; Educational Testing Service, Research Report RR-07-07; Mar. 2007.
Sheehan, Kathleen, O'Reilly, Tenaha; The CBAL Reading Assessment: An Approach for Balancing Measurement and Learning Goals; Educational Testing Service, Research Report RR-11-21; May 2011.
Shermis, Mark, Hammer, Ben; Contrasting State-of-the-Art Automated Scoring of Essays: Analysis; In Handbook of Automated Essay Evaluation: Current Applications and New Directions, M. Shermis & J. Burstein (Eds.); Routledge: New York, NY; pp. 323-346; 2012.
Smarter Balanced Assessment Consortium; General Item Specifications; [online] [retrieved Sep. 25, 2015]; Apr. 16, 2012.
Smarter Balanced Assessment Consortium; SBAC Appendices; [online] [retrieved Sep. 25, 2015]; 2012.
State of Florida Department of Education; Invitation to Negotiation: PARCC Item Development; 2012.
Wengelin, Asa, Torrance, Mark, Holmqvist, Kenneth, Simpson, Sol, Galbraith, David, Johansson, Victoria, Johansson, Roger; Combined Eyetracking and Keystroke-Logging Methods for Studying Cognitive Processes in Text Production; Behavior Research Methods, 41(2); pp. 337-351; 2009.
Attali, Yigal; Validity and Reliability of Automated Essay Scoring; Ch. 11 in Handbook of Automated Essay Evaluation: Current Applications and New Directions, M. Shermis & J. Burstein (Eds.); Routledge Academic: New York, NY; pp. 181-198; 2013.
Ben-Simon, Anat, Bennett, Randy; Toward More Substantively Meaningful Automated Essay Scoring; Journal of Technology, Learning, and Assessment, 6(1); Aug. 2007.
Cambridge, D., Cambridge, B., Yancey, K.; Electronic Portfolios 2.0: Emergent Research on Implementation and Impact; Stylus Publishing, LLC; 2009.
Council of Writing Program Administrators; Framework for Success in Postsecondary Writing; Council of Writing Program Administrators, the National Council of Teachers of English and the National Writing Project; Jan. 2011.
Klobucar, Andrew, Deane, Paul, Elliot, Norbert, Ramineni, Chaitanya, Deess, Perry, Rudniy, Alex; Automated Essay Scoring and the Search for Valid Writing Assessment; Ch. 6 in International Advances in Writing Research: Cultures, Places, Measures, C. Bazerman et al. (Eds.); WAC Clearinghouse: Fort Collins, CO; pp. 103-119; 2012.
Ramineni, Chaitanya; Validating Automated Essay Scoring for Online Writing Placement; Assessing Writing, 18; pp. 40-61; 2013.
Whitely, Susan Embretson; Construct Validity: Construct Representation Versus Nomothetic Span; Psychological Bulletin, 93(1); pp. 179-197; 1983.

* cited by examiner

SYSTEMS AND METHODS FOR GENERATING AUTOMATED EVALUATION MODELS

CROSS-REFERENCE TO RELATED APPLICATIONS

The present application claims priority from U.S. Provisional Application Ser. No. 61/813,674 entitled "A Canonical Approach for Automated Scoring of Constructed Response Items," filed Apr. 19, 2013, the entirety of which is hereby incorporated by reference.

FIELD

This disclosure is related generally to automated evaluation models and more particularly to automated evaluation or scoring models for open-ended test responses.

BACKGROUND

Automated scoring models for scoring constructed responses of test takers (examinees) are known in the art and are conventionally trained using a set of training responses to a given test and using associated human-assigned scores. The present inventors have observed a number of potential shortcomings in the conventional training approach, however. For example, the conventional model-training process assumes that the human-assigned scores are reliable. In practice, however, such assumption is often too optimistic, as certain features of the training responses, such as response length, may have unduly influenced the human scorers' evaluations. Consequently, scoring model trained using the traditional process may undesirably reflect such undue bias (e.g., the scoring model may assign unduly high weights to response lengths). In addition, the scoring model may be more susceptible to being "gamed." For example, an examinee who knows that a scoring model places significant weight on response length may attempt to get a better score by lengthening its response without adding substance. Another shortcoming is that such a model may unfairly disadvantage certain populations. For example, if essay length is heavily weighted, an Arabic examinee who is not accustomed to writing from left to right might not generate responses that are as lengthy as those generated by examinees who are so accustomed. Thus, the present inventors have observed a need for an improved method for generating an automated scoring model.

SUMMARY

Systems and methods are described for generating a scoring model for responses. A computer-implemented method of calibrating a scoring model for scoring examinee responses includes accessing a plurality of training responses with a processing system for training the scoring model. The training responses, and the examinee responses to be scored, are constructed responses. The plurality of training responses are analyzed with the processing system to derive values of multiple features of the training responses. The multiple features correspond to variables of the scoring model. The scoring model is trained with the processing system based on the values of the multiple features of the training responses and one or more external measures of proficiency for each individual associated with a training response utilized in the training. The one or more external measures are not derived from the training responses. Based on the training, a weight for at least some of the multiple features is determined. The scoring model is calibrated to include the weights for at least some of the features such that the scoring model is configured to generate scores for examinee responses.

As another example, a non-transitory computer-readable medium is encoded with instructions for causing a processing system to execute steps for calibrating a scoring model for scoring examinee responses. The instructions cause the processing system to access a plurality of training responses for training the scoring model for scoring examinee responses, where the training responses and examinee responses are constructed responses. The instructions cause the processing system to analyze the plurality of training responses to derive values of multiple features of the training responses. The multiple features correspond to variables of the scoring model. The processing system is caused to train the scoring model based on the values of the multiple features of the training responses and one or more external measures of proficiency for each individual associated with a training response utilized in the training. The one or more external measures are not derived from the training responses. The processing system is caused to determine, based on the training, a weight for at least some of the multiple features. The processing system is caused to calibrate the scoring model to include the weights for at least some of the features such that the scoring model is configured to generate scores for examinee responses.

As a further example, a system for calibrating a scoring model for scoring examinee responses includes a processing system and a memory coupled to the processing system. The system is configured to access a plurality of training responses for training the scoring model for scoring examinee responses, where the training responses and examinee responses are constructed responses. The system is configured to analyze the plurality of training responses to derive values of multiple features of the training responses. The multiple features correspond to variables of the scoring model. The system is configured to train the scoring model based on the values of the multiple features of the training responses and one or more external measures of proficiency for each individual associated with a training response utilized in the training. The one or more external measures are not derived from the training responses. The system is configured to determine, based on the training, a weight for at least some of the multiple features. The processing system is configured to calibrate the scoring model to include the weights for at least some of the features such that the scoring model is configured to generate scores for examinee responses.

DETAILED DESCRIPTION

Systems and methods described herein for training scoring models for scoring examinee responses are based on one or more of (1) values of multiple features derived from analysis of training responses, (2) external measures of examinee proficiency in the relevant subject matter being scored, where the external measures are not derived from the training responses, and (3) optionally, predetermined (e.g., human-assigned) scores associated with the training responses. Both the training responses, and the examinee responses to be scored, are constructed responses (i.e., responses comprising one or more sentences, a paragraph, an essay of multiple paragraphs, etc., generated by an individual, which may be textual or spoken). Spoken response can be converted to text for analysis using any suitable speech-to-text conversion approaches and algorithms such as those conventionally known to those of ordinary skill in the art. The approaches described herein may improve the reliability and validity of automatically generated scores using a computer grading system for scoring constructed responses.

The training responses may be analyzed to derive values of features that measure each training response's grammar correctness, vocabulary, word usage, mechanics, spelling, word frequency, fluency, etc. This can be done with various numerical measures known to those of ordinary skill in the art. For example, one numerical measure of grammar correctness can be derived from analysis of a constructed response by parsing the associated text for n-grams (e.g., bigrams, trigrams, etc.) for comparison to n-gram statistics from a reference corpus to identify low frequency n-grams in the constructed response compared to the corpus. These numerical frequencies can then be normalized in some suitable way, such as by the word length of the constructed response, to determine a suitable numerical measure of grammar correctness. As another example, a suitable numerical measure for vocabulary can be based on analysis of average word length (number of characters in a word). As a further example, a suitable measure for correction of spelling can be determined from comparison of words in the constructed response to a dictionary to identify a word count of spelling errors, which could be normalized if desired. These and other numerical measures for the quantities above are well known to those of ordinary skill in the art. Similarly, proper mechanics (e.g., punctuation, capitalization, etc.) can be measured by identifying and counting mechanics errors that occur in the text and optionally normalized if desired (e.g., normalized to the length of the constructed response). Measures of fluency in recorded speech can be determined by analysis of various aspects of the speech including speed of the speech, the number and duration of pauses in the speech, etc., as known to those of ordinary skill in the art. Of course, numerical measures that can be used for determining values of the multiple features of constructed responses are not limited to these examples, and any suitable numerical measures for such features may be used.

The external measures, which are not derived from the training responses, are measurements of an individual's proficiency that are relevant to the subject areas intended to be scored by the scoring model. For example, external measures may include an individual's scores from a different test, scores from other sections of the same test that are not derived from the training response items at issue, grades from relevant classes, self-reported competency measures for the individual, competency measures reported by others for the individual, etc. Thus, it will be appreciated that the external measures are not directly related to the training responses. For instance, if a prompt instructed an examinee to read a short essay and then write a two paragraph summary, the external measures would not be derived from the two paragraph summary constructed by the examinee. However, an external measure could be derived, for example, from the score of a different part of the same overall test or a different test, e.g., the score from a true/false section of the same test, a proficiency level from a different part of the same test or a different test, etc.

Figure 1:
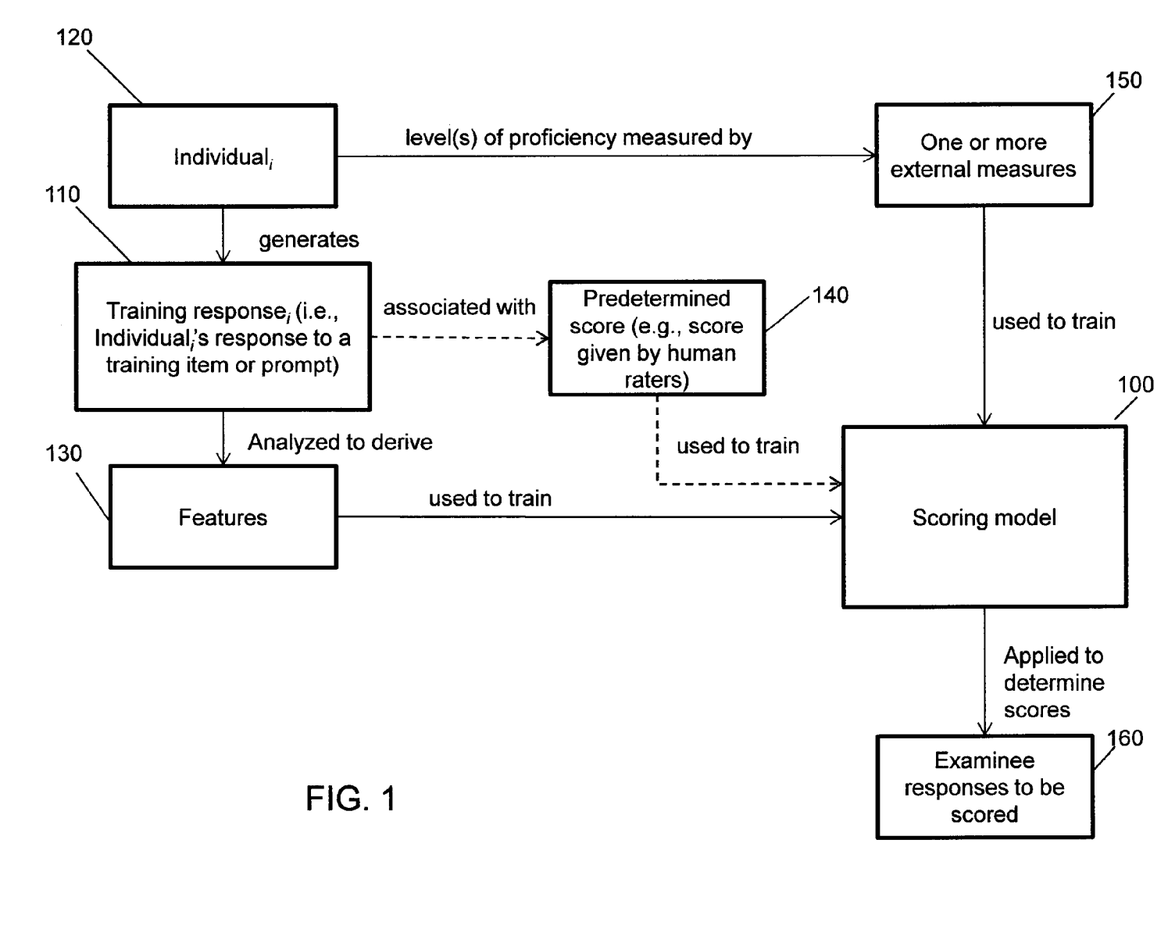
FIG. 1 is a block diagram depicting generation of a scoring model.

FIG. 1 is a block diagram depicting one embodiment of the systems and methods for generating scoring models. The system can be implemented using any suitable combination of hardware, software, and/or firmware using algorithms implemented in any suitable programming language such that a processing system of a computer system is configured to carry out the exemplary approaches described herein. A scoring model 100 for scoring a particular examinee response 160 may be trained based on any number of training response items, e.g., 25, 50, 100 or more training responses. A training response$_i$ 110, which is a constructed response, is generated by an individual$_i$ 120 in response to a training item (e.g., a test prompt or essay topic). The training item may be the same as, substantially the same as, or related to the prompt for the examinee response to be scored 160. It is possible that the prompt for the training responses may not be the same as the prompt to be used for obtaining examinee responses in later testing of examinees. The training response$_i$ 110 may be analyzed to derive values for one or more features 130 of the training response$_i$ 110, such as grammar correctness, word usage, mechanics, spelling, word frequency, fluency, etc., as mentioned above. The values for the features 130 may be used to train the scoring model 100, as discussed hereinafter.

Each training response$_i$ 110 may be associated with a predetermined score 140, such as a score given by a human rater. As discussed below, the predetermined score 140 may optionally be used in combination with other information to train the scoring model 100.

The individual$_i$ 120 who generated the training response$_i$ 110 may have a proficiency level(s) (e.g., competency level(s)) measured by one or more external measures 150 in the subject scored. The external measures 150 are termed "external" because they are outside the scope of the training response$_i$ 110 (i.e., not derived from the training response$_i$ 110). For example, if the training response$_i$ 110 is a written response to a section of a writing test, the external measures 150 may include the individual$_i$'s 120 scores on one or more other sections of the test and/or scores on one or more other writing tests. The external measure 150 may also include the individual$_i$'s 120 grades in an English writing class, his self-reported writing proficiency assessment, and any other measures of his writing proficiency, which again are not derived from the training response$_i$ 110.

The scoring model 100 may be constructed to use a variety of frameworks. In general, the scoring model 100 may be represented by a mathematical relationship between a set of independent variables and a set of dependent variables. For example, the mathematical framework could employ a linear model, such as:

$$\text{Score} = a_0 + a_1 \cdot V_1 + a_2 \cdot V_2 + a_3 \cdot V_3 + a_4 \cdot V_4 + \ldots,$$

where Score is a dependent variable whose value may represent the score of a constructed response of an examinee determined according to the scoring model, the variables $V_i$ are independent variables that represent values of the features determined from analyzing the constructed response (e.g., numerical values indicative of grammar correctness, vocabulary, word usage, spelling, word frequency, etc.), and the coefficients $a_i$ represent weighting coefficients for the associated variables $V_i$. More generally, the scoring model is not limited to a linear model such as illustrated above can be a suitable function F of the weighting coefficients $a_i$ and the variables $V_i$, i.e.:

$$\text{Score} = F(a_i, V_i)$$

For example, the function F in the scoring model could combine powers of various variables, products of certain variables, etc., and the choice of the particular mathematical form of the model in this regard is within the purview of one of ordinary skill in the art. In exemplary work conducted by the present inventors, a linear model was used.

The values for at least some of the coefficients $a_i$ are determined through training the model with a training process. For example, it may be desirable to determine values for all of the coefficients, or it may be desirable to determine values for fewer than all of the coefficients, e.g., in a scenario where some coefficients are set and held to fixed values. Various exemplary approaches for training the scoring model are described herein below, all of which utilize values for one or more external measures, such as described above, as one or more dependent variables $M_i$ (e.g., $M_1$, $M_2$, $M_3$, etc.) for training the scoring model. For example, an objective of training the scoring model 100 is to determine values for those weights $a_i$ that would result in an optimal correlation between the independent variables and dependent variables in view of the training responses. The scoring model 100 is calibrated using the determined weights $a_i$ as the coefficients for the associated independent variables and/or selecting a subset of independent variables to use (e.g., independent variables associated with weights falling below a chosen threshold may be excluded from the scoring model 100, such as those weights that are negative or very small, e.g., below 0.01, 0.005, 0.001, etc.). The final set of weighted and selected independent variables are then used as the scoring model 100 for scoring examinee responses.

In one exemplary embodiment, the scoring model 100 may use the values of the features 130 of the training responses 110 as independent variables and may use the values of external measures $M_i$ 150 as the dependent variables, wherein predetermined scores 140 from human scorers for the training response are not utilized whatsoever for training the scoring model 100. This training example is very different from conventional training approaches that rely upon human assigned scores as a basis for training a scoring model because this training example does not rely upon human assigned or predetermined scores for the training responses whatsoever and instead uses external measures not derived from the training responses as dependent variables for training. In this example, the scoring model can be trained by replacing the Score variable on the left hand side with a function of the values of external measures $M_i$, i.e.:

$$G(M_i)=F(a_i, V_i)$$

where $G(M_i)$ is a function of the values of external measures $M_i$, e.g., such as a linear combination $M_1+M_2+M_3+\ldots$, or some other function of the values of external measures $M_i$. The model can then be trained using the computer processing system by accessing the training response for each of a number of individuals (e.g., 50, 100, etc., individuals), processing each of those training responses (which are constructed responses) to determine values for the features (the variables $V_i$) for each of the individuals' training responses, accessing the values for the external measures $M_i$ for each of the individuals, and then processing that system of equations (e.g., 50 or 100 equations, etc., one for each individual) to determine the values for the coefficients $a_i$ that optimize or satisfy suitable correlation criteria between the dependent variables (left side of the equation) and independent variables (right side of the equation), e.g., that provides a best fit to the data. Where multiple dependent variables are utilized in the training process, canonical correlation analysis may be used, for example, in the training process to determine the values of $a_i$. If the scoring model 100 has only one dependent variable, multiple regression analysis may be used, for example, to determine the weights for the independent variables. After the values of weights $a_i$ are determined from training, the scoring model is updated (calibrated) to include the values of those weights $a_i$, and external measures are not included in the scoring model. In this regard, it will be appreciated that the values of the external measures are only temporary dependent variables that are utilized for the process of training the scoring model. That is, the values of the external measures do not themselves make up a permanent component of the scoring model for scoring examinee responses.

In another exemplary embodiment, the scoring model can be trained by using the values of the features 130 as independent variables, by using the predetermined scores 140 as temporary independent variables (as opposed to dependent variables) for purposes of training and by using values of the external measures $M_i$ 150 as temporary dependent variables for purposes of training. That is, in this embodiment, the predetermined, e.g., human assigned, scores 140 may be temporary independent variables, meaning that they are used during model training but not included in the final calibrated scoring model for scoring examinee responses. This training example is also very different than conventional training processes that use human assigned scores as dependent variables, because in this training example, human assigned scores are used as independent variables, not dependent variables, and because values of external measures not derived from the training responses are used as dependent variables for training. The training of the model can be carried out as explained in the first example above.

In yet another exemplary embodiment, the scoring model can be trained by using values of the features 130 as independent variables, using values the external measures 150 as dependent variables, and using the predetermined, e.g., human assigned, scores 140 as dependent variables. This training example is also very different than conventional training processes that use human assigned scores as dependent variables, because in this training example, human assigned scores are combined as dependent variables, for purposes of training, with values of external measures not derived from the training responses which are also used as dependent variables for training. The training of the model can be carried out as explained in the first example above.

Note in each of these embodiments, the values of the external measures that are used as dependent variables may be considered as "temporary" variables, since they are using as part of the training process but will not be part of the calibrated scoring model 100 that is used for scoring examinee responses.

In each of these exemplary training processes, the computer processing used for determining the relationship between the variables during the training process may be carried out using any suitable approaches known to one of ordinary skill in the art. For example, as noted above, if the training involves use of two or more dependent variables, the relationship between the independent variables and dependent variables may be analyzed using canonical correlation analysis. If the training involves use of only one dependent variable, multiple regression analysis may be used to determine the weights for the independent variables, for example.

Analyses carried out by the inventors have shown that training processes as described above using values of the features 130 and optionally the predetermined scores 140 as the independent variables, and using values of external measures 150 as the dependent variables, may effectively decrease the weight and importance given to features associated with response length, and may improve the fairness of the resulting machine scores produced by the final scoring model across population groups with different demographic backgrounds.

Figure 2:
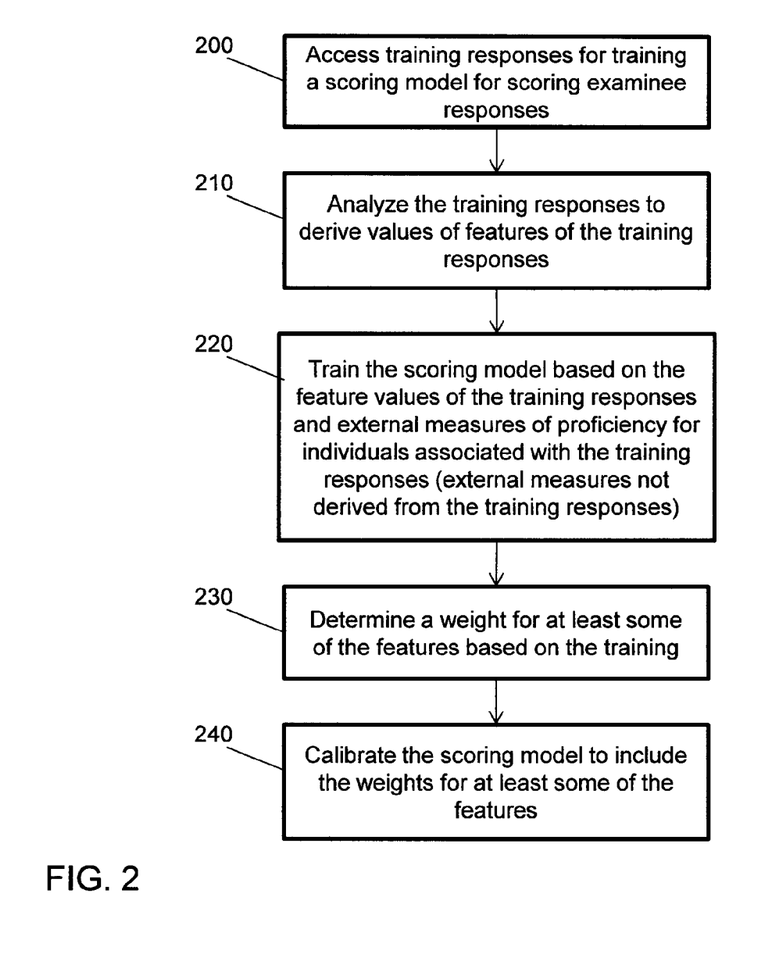
FIG. 2 is a flow diagram depicting a computer-implemented method of generating a scoring model.

FIG. 2 is a flow diagram for an exemplary process for training a scoring model using a processing system. At 200, relevant training responses for a set of individuals are accessed by the processing system for use in training the scoring model. Training responses may be considered relevant, for example, if they substantially represent the examinee responses intended to be scored by the scoring model. For example, if the scoring model is intended to score written essay responses to a particular test prompt, the training responses may be written essay responses to that same or a substantially similar test prompt. If the scoring model is intended to score spoken responses, the training responses may similarly be spoken responses (in which case the responses can be processed by convention speech-to-text algorithms to provide text to be processed according to the approaches described herein). In addition, it may be beneficial for the training responses to represent those for a cross section of performance levels of the associated individuals, e.g., excellent, very good, satisfactory, unacceptable, for instance, so as to provide a broad cross section across proficiency levels for satisfactory training. The particular scoring model used—as well as its associated independent and dependent variables—may be selected, configured, programmed, or installed using any conventional means known by one of ordinary skill in the art, in accordance with the approaches for training described above. As discussed above, the training of a scoring model may utilize values for features of training responses as independent variables, values for one or more external measures not derived from training responses as dependent variables, and optionally predetermined, e.g., human assigned, scores of training responses as either independent variables or dependent variables, if predetermined scores are used in training.

At 210, the processing system analyzes each training response to derive values of the features of that training response (e.g., grammar correctness, vocabulary, etc.). As described above, any suitable methods such as those conventionally known to those of skill in the art may be used to derive values for the features.

At 220, the processing system trains the scoring model based on the derived feature values of the training responses and values of the external measures of proficiency for individuals associated with the training responses (again, the external measures are not derived from the training responses). The particular features (e.g., grammar correctness) and external measures (e.g., other class grades) used in the training can depend on the particular scoring model selected. As noted above in one embodiment, features of training responses are used as independent variables in the scoring model, and external measures are used as temporary dependent variables for purposes of training the model (but are not included in the final calibrated scoring model for scoring examinee responses). Depending on the training approach selected, predetermined scores associated with the training responses may or may not be used for training. If used, the predetermined scores may be used together with the values of the external measures as dependent variables for purposes of training. Alternatively, the predetermined score may be used together with the values of the features as independent variables for purposes of training, in which case the predetermined scores would be temporary independent variables (i.e., they are used during model training but will not be part of the calibrated scoring model for scoring examinee responses).

The independent variables' correlation with the dependent variables may be assessed using any suitable approaches as described above. For example, canonical correlation analysis may be used for training that involves multiple dependent variables, and multiple regression analysis may be used for training that involves only a single dependent variable. The training method analyzes the training responses and, at 230, determines weights for the independent variables (e.g., features), e.g., that optimize their correlation with the dependent variables (e.g., external measures) or otherwise satisfy selected training criteria, e.g., provides a best fit or acceptable fit according to criteria selected by the designer of the model.

At 240, the weights assigned to the independent variables are used to calibrate the scoring model for scoring examinee responses. In one exemplary embodiment, each weighted feature may be used in the calibrated scoring model, regardless of the weight. In another exemplary embodiment, a feature with an insignificant weight or a negative weight may cause the feature to be excluded from the calibrated scoring model (e.g., the weight for that feature may be set to zero), for instance. As noted previously, if temporary independent variables were used to train the model, such as predetermined scores of training responses used as temporary independent variables, those temporary independent variables are not included in the calibrated scoring model for scoring examinee responses.

In another exemplary embodiment, a further training process may be carried out to refine the scoring model. For example, if one training process yields coefficients for variables where the coefficients are negative or fall below associated threshold values, those features may be removed from the scoring model undergoing training, and another training process may be carried without those features. In such a case, the additional training may yield coefficients for variables that are different from those obtained in the prior training process. The model can then be calibrated (updated) to exclude the features that were removed and to use the coefficients for the remaining features that serve as independent variables in the scoring model.

The scoring model, once calibrated based on the weights, can be used to automatically score examinee responses. Such scoring can be carried out by processing an examinee constructed response with a computer processing system to determine values of the features of permanence utilized, e.g., those that may be indicative of grammar correctness, vocabulary, word usage, mechanics, spelling, word frequency, fluency, etc., and applying the calibrated scoring model to those measures. Performance of the calibrated scoring model may be validated, if desired, by comparing the automatically generated scores with their associated external measures and/or predetermined scores, e.g., human assigned scores, (if any) for constructed responses using an independent sample of individuals outside the training sample. Using the described systems and methods, the correlation between the automatically generated scores and their respective external measures (particularly those external measures used in model training) may be improved so as to provide a useful and reliable scoring model for constructed responses of examinees.

Figure 3A:
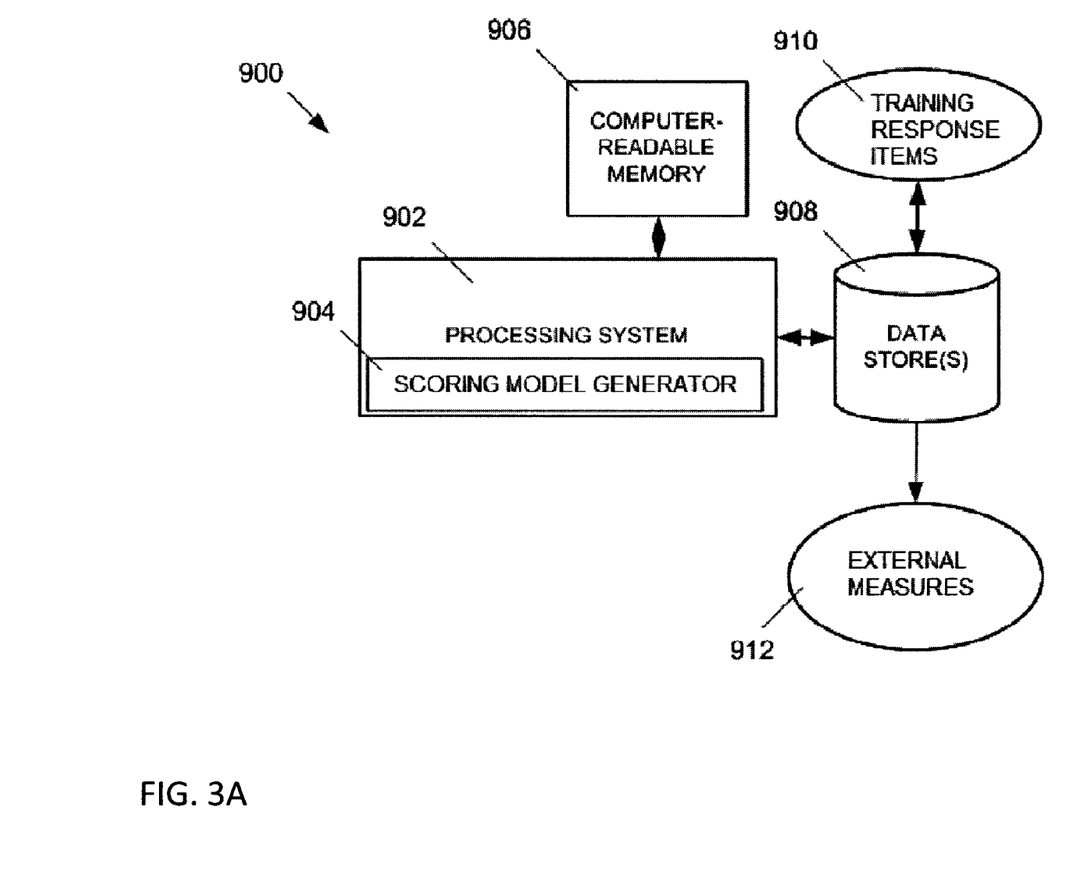
FIGS. 3A, 3B, and 3C depict example systems for use in implementing a system for generating scoring models.
Figure 3B:
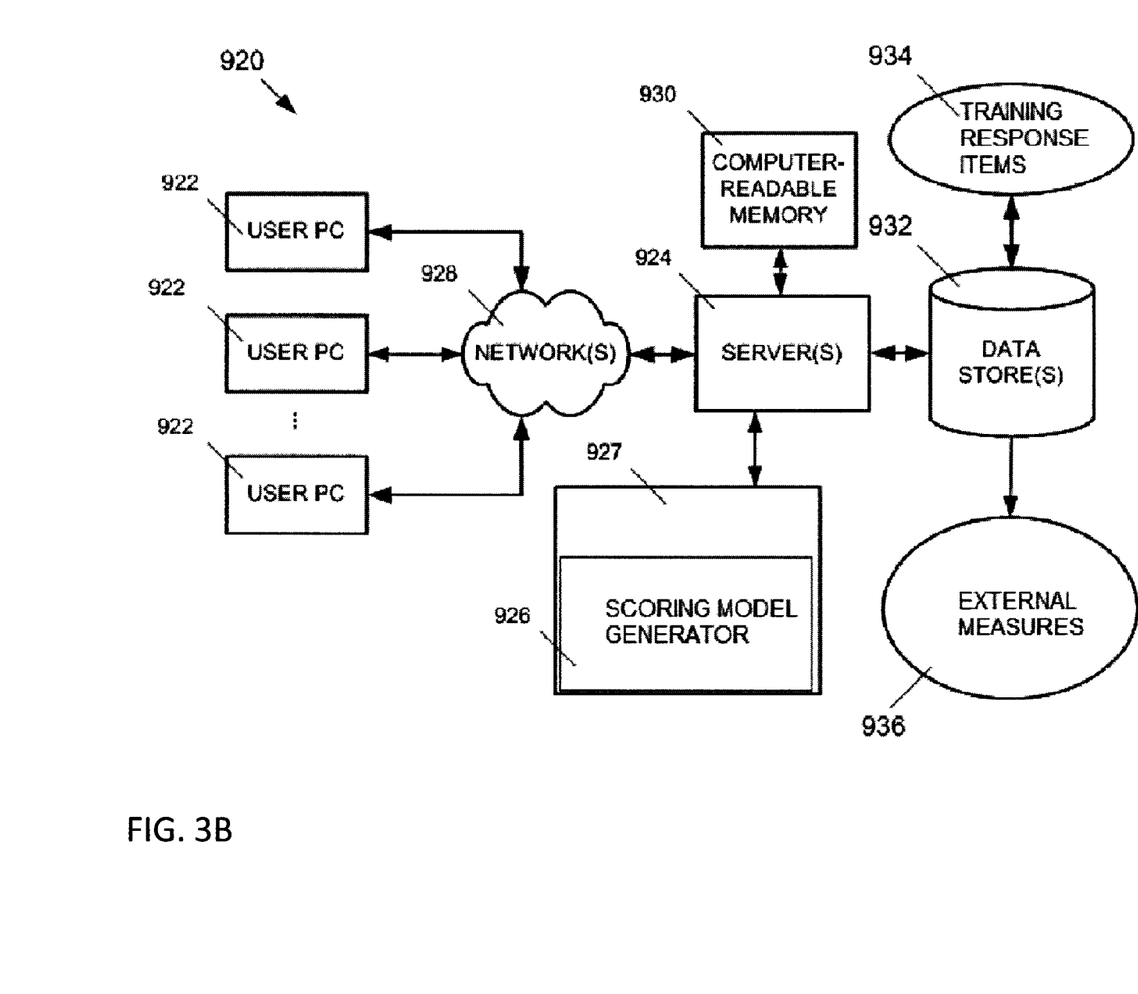
Figure 3C:
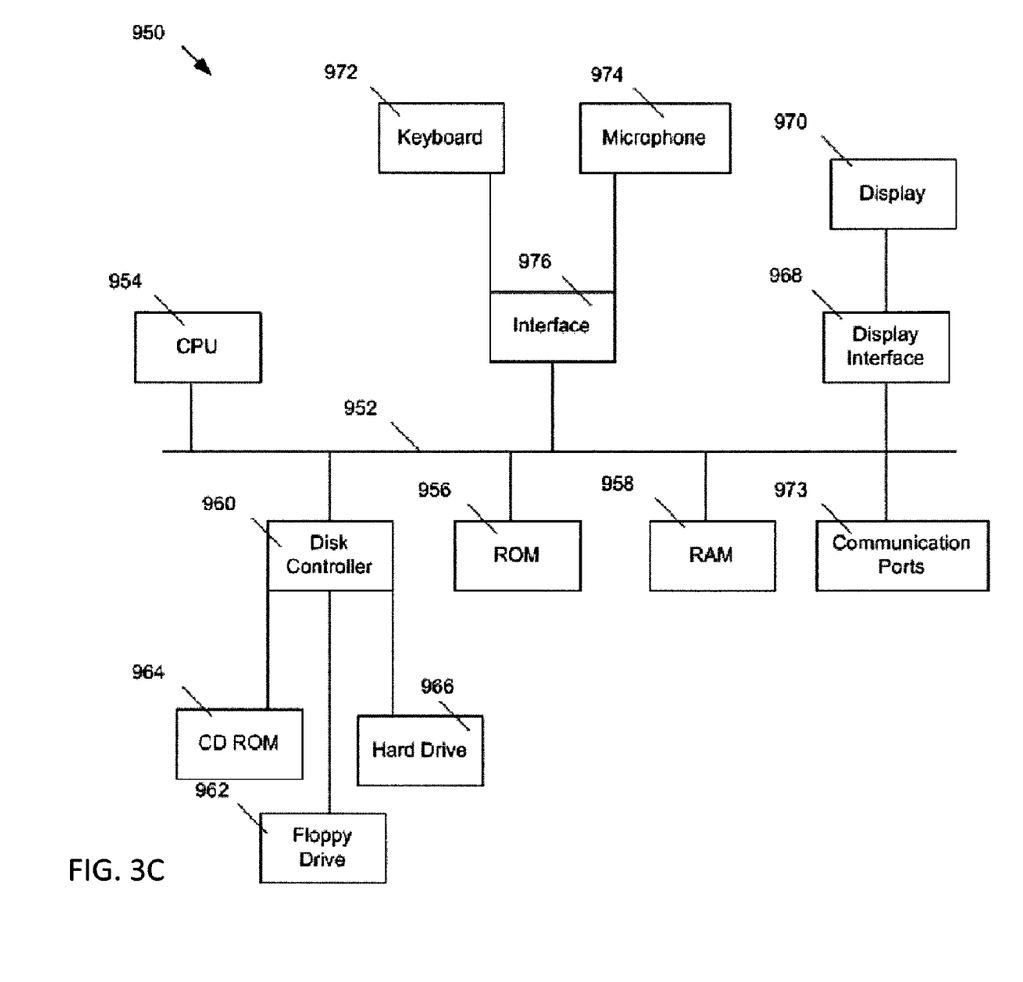

Additional examples will now be described with regard to additional exemplary aspects of implementation of the approaches described herein. FIGS. 3A, 3B, and 3C depict example systems for use in implementing a scoring model generator. For example, FIG. 3A depicts an exemplary system 900 that includes a standalone computer architecture where a processing system 902 (e.g., one or more computer processors located in a given computer or in multiple computers that may be separate and distinct from one another) includes a scoring model generator 904 being executed on it. The processing system 902 has access to a computer-readable memory 906 in addition to one or more data stores 908. The one or more data stores 908 may include training response items 910 as well as external measures 912.

FIG. 3B depicts a system 920 that includes a client server architecture. One or more user PCs 922 access one or more servers 924 running a scoring model generator 926 on a processing system 927 via one or more networks 928. The one or more servers 924 may access a computer readable memory 930 as well as one or more data stores 932. The one or more data stores 932 may contain training response items 934 as well as external measures 936.

FIG. 3C shows a block diagram of exemplary hardware for a standalone computer architecture 950, such as the architecture depicted in FIG. 3A that may be used to contain and/or implement the program instructions of system embodiments of the present invention. A bus 952 may serve as the information highway interconnecting the other illustrated components of the hardware. A processing system 954 labeled CPU (central processing unit) (e.g., one or more computer processors at a given computer or at multiple computers), may perform calculations and logic operations required to execute a program. A non-transitory processor-readable storage medium, such as read only memory (ROM) 956 and random access memory (RAM) 958, may be in communication with the processing system 954 and may contain one or more programming instructions for performing the method of implementing a scoring model generator. Optionally, program instructions may be stored on a non-transitory computer readable storage medium such as a magnetic disk, optical disk, recordable memory device, flash memory, or other physical storage medium.

A disk controller 960 interfaces one or more optional disk drives to the system bus 952. These disk drives may be external or internal floppy disk drives such as 962, external or internal CD-ROM, CD-R, CD-RW or DVD drives such as 964, or external or internal hard drives 966. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 960, the ROM 956 and/or the RAM 958. Preferably, the processor 954 may access each component as required.

A display interface 968 may permit information from the bus 952 to be displayed on a display 970 in audio, graphic, or alphanumeric format. Communication with external devices may optionally occur using various communication ports 973.

In addition to the standard computer-type components, the hardware may also include data input devices, such as a keyboard 972, or other input device 974, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A computer-implemented method of calibrating a scoring model for scoring examinee responses, comprising:

accessing a plurality of training responses with a processing system for training a scoring model for scoring examinee responses, the training responses and examinee responses being constructed responses;

analyzing the plurality of training responses with the processing system to derive values of multiple features of the training responses, the multiple features corresponding to variables of the scoring model;

training the scoring model with the processing system based on the values of the multiple features of the training responses and one or more external measures of proficiency for each individual associated with a training response utilized in the training, the one or more external measures not being derived from the training responses;

determining, based on said training, a weight for each of the multiple features; and calibrating the scoring model to include the weights for at least some of the features such that the scoring model is configured to generate scores for examinee responses.

2. The method of claim 1, further comprising:

using the scoring model to automatically generate a score for an examinee response constructed by an examinee; and validating the score using the one or more external measures of proficiency for the examinee.

3. The method of claim 1, wherein the examinee responses are written responses or spoken responses.

4. The method of claim 1, wherein the multiple features are treated as independent variables in the calibrated scoring model and the one or more external measures are treated as temporary dependent variables for training the scoring model.

5. The method of claim 4, wherein the training further includes treatment of predetermined scores for the training responses as temporary independent variables that are not included in the calibrated scoring model.

6. The method of claim 4, wherein the training further includes treatment of predetermined scores for the training responses as additional temporary dependent variables in combination with the one or more external measures.

7. The method of claim 1, wherein at least one of the one or more external measures of proficiency for an individual associated with a training response is selected from the group consisting of:
   a score associated with a different portion of a same test from which the training response is derived;
   a class grade received by the individual; and
   a competency measure of the individual.

8. The method of claim 1, wherein the training comprises canonical correlation analysis to analyze relationships between the multiple features and the one or more external measures.

9. A non-transitory computer-readable medium encoded with instructions for causing a processing system to execute steps for calibrating a scoring model for scoring examinee responses, comprising:

accessing a plurality of training responses with a processing system for training a scoring model for scoring examinee responses, the training responses and examinee responses being constructed responses;

analyzing the plurality of training responses with the processing system to derive values of multiple features of the training responses, the multiple features corresponding to variables of the scoring model;

training the scoring model with the processing system based on the values of the multiple features of the training responses and one or more external measures of proficiency for each individual associated with a training response utilized in the training, the one or more external measures not being derived from the training responses;

determining, based on said training, a weight for each of the multiple features; and calibrating the scoring model to include the weights for at least some of the features such that the scoring model is configured to generate scores for examinee responses.

10. The non-transitory computer-readable medium of claim 9, further comprising instructions for causing the processing system to execute steps, including:

using the scoring model to automatically generate a score for an examinee response constructed by an examinee; and validating the score using the one or more external measures of proficiency for the examinee.

11. The non-transitory computer-readable medium of claim 9, wherein the examinee responses are written responses or spoken responses.

12. The non-transitory computer-readable medium of claim 9, wherein the multiple features are treated as independent variables in the calibrated scoring model and the one or more external measures are treated as temporary dependent variables for training the scoring model.

13. The non-transitory computer-readable medium of claim 12, wherein the training further includes treatment of predetermined scores for the training responses as temporary independent variables that are not included in the calibrated scoring model.

14. The non-transitory computer-readable medium of claim 12, wherein the training further includes treatment of predetermined scores for the training responses as additional temporary dependent variables in combination with the one or more external measures.

15. The non-transitory computer-readable medium of claim 9, wherein at least one of the one or more external measures of proficiency for an individual associated with a training response is selected from the group consisting of:
   a score associated with a different portion of a same test from which the training response is derived;
   a class grade received by the individual; and
   a competency measure of the individual.

16. The non-transitory computer-readable medium of claim 9, wherein the training comprises canonical correlation analysis to analyze relationships between the multiple features and the one or more external measures.

17. A system for calibrating a scoring model for scoring examinee responses, comprising:

a processing system; and a memory coupled to the processing system, wherein the processing system is configured to execute steps, comprising:

accessing a plurality of training responses with the processing system for training a scoring model for scoring examinee responses, the training responses and examinee responses being constructed responses;

analyzing the plurality of training responses with the processing system to derive values of multiple features of the training responses, the multiple features corresponding to variables of the scoring model;

training the scoring model with the processing system based on the values of the multiple features of the training responses and one or more external measures of proficiency for each individual associated with a training response utilized in the training, the one or more external measures not being derived from the training responses;

determining, based on said training, a weight for each of the multiple features; and calibrating the scoring model to include the weights for at least some of the features such that the scoring model is configured to generate scores for examinee responses.

18. The system of claim 17, wherein the processing system is further configured to execute steps, including:
   using the scoring model to automatically generate a score for an examinee response constructed by an examinee; and
   validating the score using the one or more external measures of proficiency for the examinee.

19. The system of claim 17, wherein the examinee responses are written responses or spoken responses.

20. The system of claim 17, wherein the multiple features are treated as independent variables in the calibrated scoring model and the one or more external measures are treated as temporary dependent variables for training the scoring model.

21. The system of claim 20, wherein the training further includes treatment of predetermined scores for the training responses as temporary independent variables that are not included in the calibrated scoring model.

22. The system of claim 20, wherein the training further includes treatment of predetermined scores for the training responses as additional temporary dependent variables in combination with the one or more external measures.

23. The system of claim 1, wherein at least one of the one or more external measures of proficiency for an individual associated with a training response is selected from the group consisting of:
   a score associated with a different portion of a same test from which the training response is derived;
   a class grade received by the individual; and
   a competency measure of the individual.

24. The system of claim 1, wherein the training comprises canonical correlation analysis to analyze relationships between the multiple features and the one or more external measures.

* * * * *